United States Patent [19]

Umeki et al.

[11] 4,112,184
[45] Sep. 5, 1978

[54] MAGNETIC RECORDING MEDIUM AND METHOD OF PREPARING

[75] Inventors: Shinji Umeki; Tatsuo Uebori; Minoru Motegi, all of Tokyo, Japan

[73] Assignee: TDK Electronic Company, Tokyo, Japan

[21] Appl. No.: 730,581

[22] Filed: Oct. 7, 1976

Related U.S. Application Data

[63] Continuation of Ser. No. 609,663, Sep. 25, 1975, abandoned, which is a continuation-in-part of Ser. No. 444,651, Feb. 21, 1974, abandoned.

[51] Int. Cl.² ............................................. H01f 10/02
[52] U.S. Cl. .................................. 428/403; 427/127; 427/128; 428/539; 428/900
[58] Field of Search ............................... 427/127–132, 427/48; 428/900, 341, 539, 538, 403; 252/62.54

[56] References Cited

U.S. PATENT DOCUMENTS

| 3,573,980 | 4/1971 | Haller et al. | 117/238 |
| 3,725,126 | 4/1973 | Haller et al. | 117/235 |

Primary Examiner—Bernard D. Pianalto
Attorney, Agent, or Firm—Oblon, Fisher, Spivak, McClelland & Maier

[57] ABSTRACT

A magnetic recording medium is prepared by depositing magnetic particles of ferromagnetic, acicular iron oxide upon whose surface is adsorbed cobalt hydroxide, on a supporting substrate.

6 Claims, 6 Drawing Figures

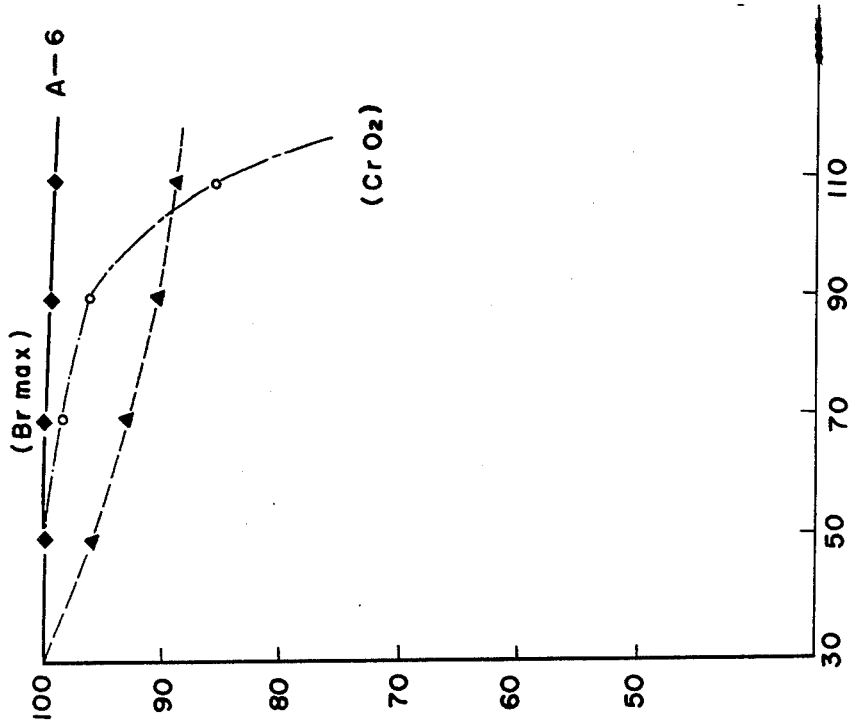
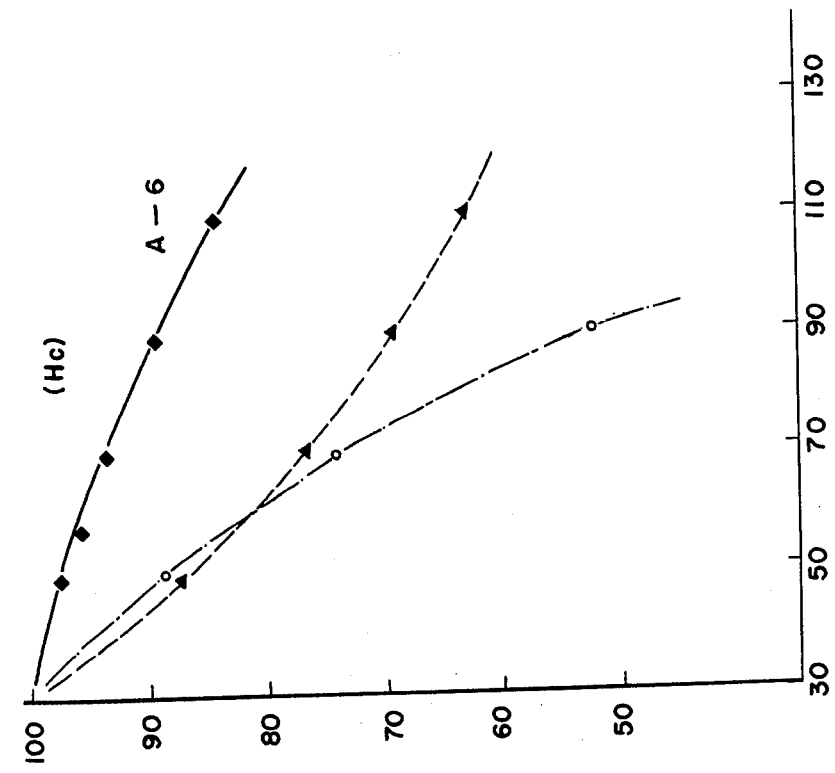

MAGNETIC RECORDING MEDIUM AND METHOD OF PREPARING

CROSS REFERENCE TO RELATED APPLICATIONS

This is a continuation of application Ser. No. 609,663 filed Sept. 25, 1975 which in turn is a continuation-in-part of application Ser. No. 444,651 filed Feb. 21, 1974, both now abandoned.

BACKGROUND OF THE INVENTION

1. Field of the Invention

This invention relates to a magnetic recording medium which is characterized by excellent magnetic characteristics and little recording head wear.

2. Description of the Prior Art

Conventional magnetic particles which have been used in the preparation of high density magnetic recording mediums generally have an acicular chromium dioxide or cobalt doped ferromagnetic iron oxide. However, these conventional magnetic particles have several undesirable features. Tapes which contain the acicular chromium dioxide have poor resistance to recording head wear as compared to those tapes which are coated with conventional iron oxides. After the tapes coated with the cobalt doped ferromagnetic iron oxide have been used repeatedly, the coated tapes exhibit inferior demagnetization characteristics and thus age. They also exhibit inferior printing effects so that the tapes have a dB of 5-6 lower than iron oxide.

A need therefore, exists for magnetic recording media which are coated with a recording substance resistant to deterioration by abrasion.

SUMMARY OF THE INVENTION

Accordingly one object of this invention is to provide a magnetic recording medium which is characterized by excellent magnetic characteristics and little recording head wear.

Another object of the present invention is to provide a method of preparing a magnetic recording medium which is characterized by excellent magnetic characteristics and little recording head wear.

Briefly, this object and other objects of the invention as hereinafter will become more readily apparent can be attained in a method for preparing a magnetic recording medium by depositing magnetic particles of ferromagnetic, acicular iron oxide upon whose surface is absorbed cobalt hydroxide, on a supporting substrate.

BRIEF DESCRIPTION OF THE DRAWINGS

A more complete appreciation of the invention and many of the attendant advantages thereof will be more readily obtained as the same becomes better understood by reference to the following detailed description when considered in connection with the accompanying drawings, wherein:

FIGS. 3a and 3b are graphs which shows the temperature dependency of the magnetic characteristics.

DETAILED DESCRIPTION OF THE PREFERRED EMBODIMENTS

Figure 1A:
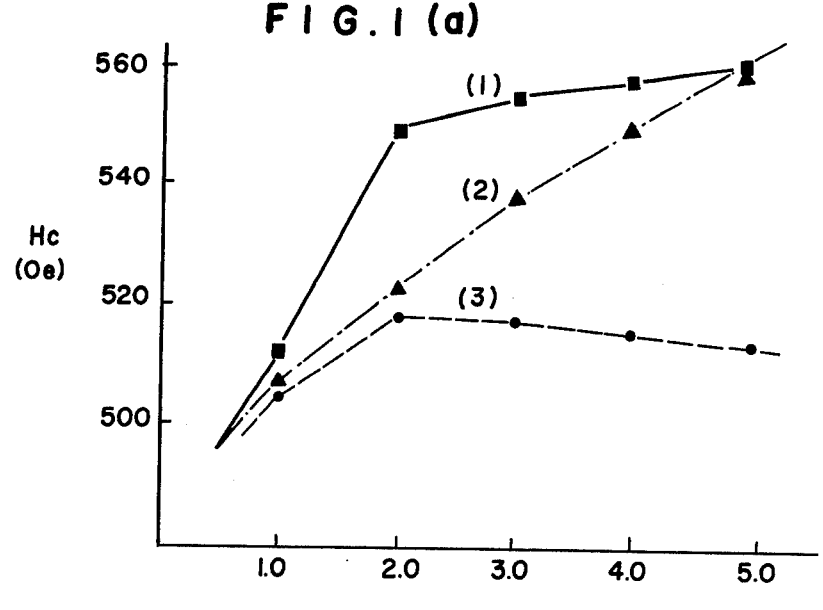
FIG. 1a is a graph which shows the relationship of the coercive force versus the amount of cobalt in the iron oxide of the reaction.

Tapes which are coated with the conventional, acicular $\gamma$-$Fe_2O_3$ have coercive forces of from 250 - 350 Oe. The coercive force of the tapes will change depending upon the amount of magnetic particles thereon. If the amount of magnetic particles is increased, the coercive force will be decreased. If the amount of magnetic particles is decreased, the coercive force will be increased. The phenomenon in which the coercive force is decreased by an increase in the density of the magnetic particles is believed to occur because of the partial interaction between the magnetic particles when the coercive force is influenced by the shape anisotropy. However, the coercive force of the chromium oxide in the magnetic particles is not appreciably changed by changes in the content of the magnetic particle. The reason for this has not been established completely. However, it is believed that the chromium dioxide is not stable in air so that the surface of the oxide is oxidized to $Cr_2O_3$. Thus, each of the acicular particles is covered with a non-magnetic layer. This would suggest that the mutual magnetic interaction between the particles is not affected by an increase in the density of the particles, and thus the change in the coercive force is low.

From these observations it was believed that magnetic particles which varied only slightly in their coercive forces could be obtained by covering the surface of the acicular iron oxide particles with a non-magnetic layer. Experiments based on this concept succeeded in establishing that ferromagnetic particles which are characterized by a high coercive force and low packing density dependency could be obtained by covering the surface of the ferromagnetic acicular iron oxide particles with cobalt hydroxide and/or cobalt oxide, then heating the modified iron oxide at relatively low temperatures to prevent the conversion of the cobalt component to the ferrite form. Previously, the present inventors prepared magnetic particles which 100 a high coercive force wherein a ferromagnetic metal or alloy membrane was precipitated on the surface of fine ferromagnetic oxide particles as shown in Japanese Patent Application No. 35860/1971. However, the ferromagnetic particles of the present invention have coercive forces 50 -100 Oe greater than the coercive forces of the material of the prior invention. When the modified ferromagnetic particles of the present invention are used in magnetic recording media, the composition has a higher sensitivity (2-3 dB greater) in the short wavelength zone (wavelength of 2-5$\mu$). Thus, the composition of the present invention is superior to the former composition.

The magnetic recording particles are formed by coating a ferromagnetic, acicular iron oxide such as $\gamma$-$Fe_2O_3$ or $Fe_3O_4$ with a cobalt salt dissolved in an aqueous solution. Suitable cobalt salts include $CoSO_4$, $CoCl_2$ and the like. The solution containing the dissolved cobalt salt and the slurry of iron oxide particles is treated with a basic aqueous solution containing a dissolved alkali. Suitable alkalis include sodium hydroxide, potassium hydroxide, ammonium hydroxide and the like. The combined solutions are then heated to a temperature of below the boiling point, preferably 50° - 100° C. and thereafter the solution is cooled and the slurry particles separated. After the particles are separated, they are dried to yield a magnetic particle wherein the ferromagnetic, acicular iron oxide particles are adsorbed with from 0.5 to 10.0 weight percent, preferably 1–5 weight percent of cobalt hydroxide. It is preferred that the average length of the ferromagnetic iron oxide crystals range from 0.1 – 1.0 μ while the ratio of the length to the width of the crystals range from 5:1 ~ 20:1.

In the preparation of the magnetic particles, the magnetic particles obtained have cobalt hydroxide adsorbed thereon. In other words, despite the form of the cobalt compound dissolved in the aqueous solution, the treatment of the aqueous solution containing the iron oxide particles and dissolved cobalt compound with base results in the adsorption of the cobalt hydroxide on the iron oxide particles. In actuality, a small portion of the cobalt hydroxide coating exists as cobalt oxide but the small amounts of cobalt oxide do not detrimentally affect the magnetic properties of the product.

Magnetic recording tapes can be made by covering a synthetic resin base with a coating of a magnetic paint. The magnetic paint is formulated by mixing the particles of ferromagnetic, crystalline, acicular iron oxide adsorbed with cobalt hydroxide in a resin solution of a synthetic resin dissolved in an organic solvent.

In the composition of the present invention, the cobalt component is not in the ferrite form. Thus, the disadvantages of magnetic instability and inferior printing effects of the conventional cobalt doped iron oxide, have been alleviated.

In the head abrasion tests using the tapes coated with the magnetic particles of the invention, it has been found that the head abrasion is substantially the same as the tapes which use conventional iron oxide. In other words, the difficulties with the abrasion resulting from the use of chromium dioxide is eliminated.

The magnetic particles of the present invention can be prepared simply and economically, and therefore can easily be mass produced. The magnetic particles have a significant industrial value for the preparation of magnetic recording media, such as magnetic recording tapes for compact sized VTR units which are now in high commercial demand. The composition can also be used in the preparation of high quality audio cassette tapes and in the preparation of magnetic credit cards which require high reliability.

Having generally described this invention, a further understanding can be obtained by reference to certain specific examples which are provided herein for purposes of illustration only and are not intended to be limiting unless otherwise specified.

EXAMPLE 1

In one method of preparation of the ferromagnetic particles of the invention, 100g of acicular ferromagnetic iron oxide ($\gamma$-$Fe_2O_3$) having an average length of about 0.4μ and a ratio of the length to the width of 10/1 was charged into a 1 liter beaker. A 500ml quantity of deionized water was added to the beaker and the mixture was stirred for 60 minutes with a mixer to form a slurry. A solution of 2–20g of cobalt chloride dissolved in 100ml of deionized water was added to the slurry, and the mixture was stirred for 10 minutes by a mixer. A solution of 10–40g of sodium hydroxide dissolved in 200ml of deionized water was added to the mixture and the mixture was stirred for 10 minutes with the mixer. The resulting stirred slurry was heated at 50°–100° C for 10–60 minutes, and then washed with water, filtered and dried. The magnetic characteristics of a number of the samples prepared with different quantities of cobalt chloride and sodium hydroxide and different reaction temperatures are shown in Table 1.

Figure 1B:
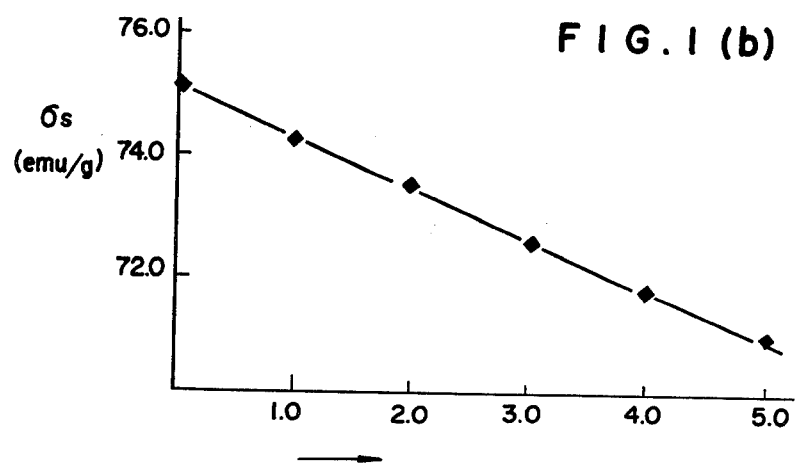
FIG. 1b is a graph which shows the relationship of the saturated magnetic moment versus the amount of cobalt in the iron oxide of the reaction.
Figure 2:
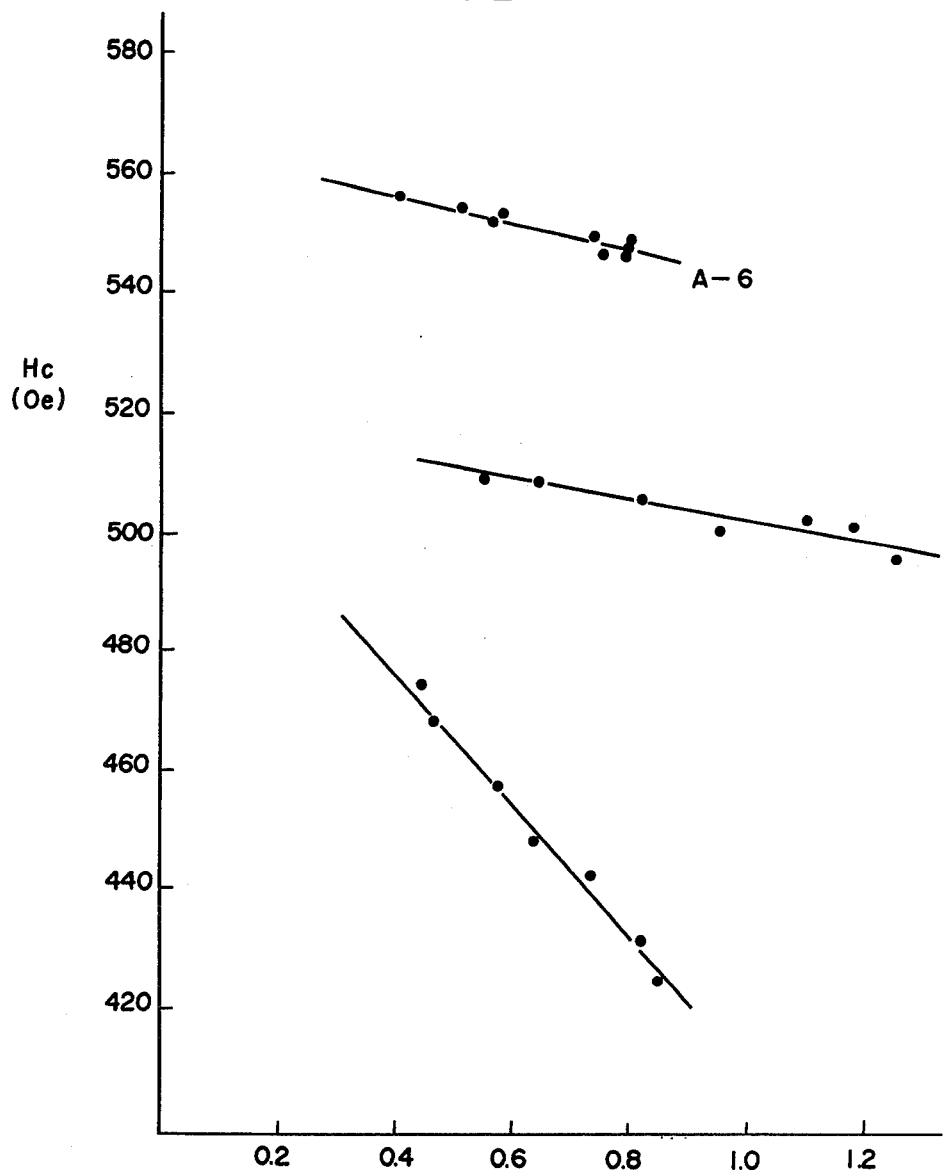
FIG. 2 is a graph which shows the relationship of coercive force versus the packing density.

The results obtained are shown in FIGS. 1a and 1b and 2. FIG. 1a is a graph which shows the relationship of the coercive force versus the quantity of cobalt in the iron oxide wherein curve (1) shows a composition prepared from a solution of 40g NaOH in 800ml of water; curve (2) shows a composition prepared from a solution of 16g of NaOH in 800ml of water; and curve (3) shows a composition prepared from a solution of 8g NaOH in 800ml of water.

FIG. 1b is a graph which shows the relationship of the saturated magnetic moment versus the quantity of cobalt in the iron oxide.

Figure 1C:
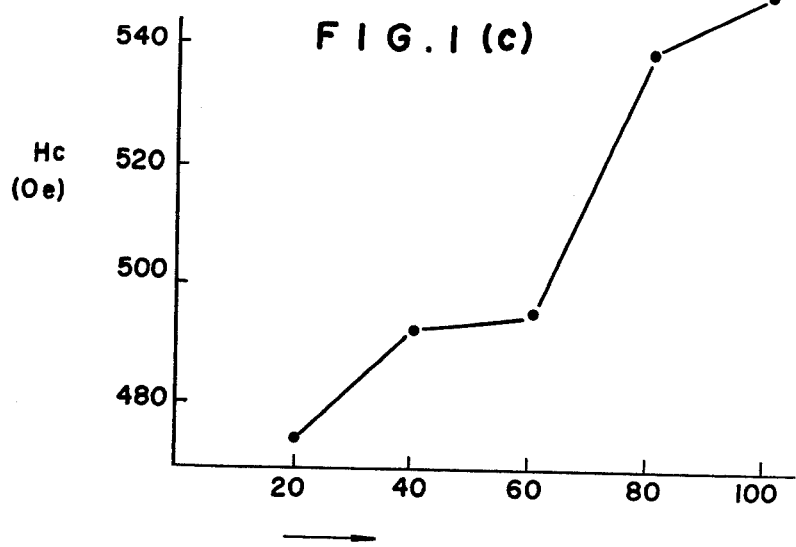
FIG. 1c is a graph which shows the relationship of the coercive force versus reaction temperature.

FIG. 1c is a graph which shows the relationship of the coercive force versus the reaction temperature. As is clear in FIG. 1, magnetic particles having coercive forces from 500 to 550 Oe can easily be prepared.

The temperature stability of the magnetic characteristics of the samples of the invention is very stable compared to the temperature stability of acicular chromium dioxide or iron oxide doped with cobalt. In FIGS. 1a and 1b, the coercive force (Hc) increases depending upon the increased amount of cobalt compenent used. However, the saturated magnetic moment [$\sigma$ s (emu/g)] decreases. Also, the coercive force (Hc) increases depending upon the degree of increase in the pH. In FIG. 1c, the coercive force (Hc) increases depending upon the increase of the reaction temperature.

FIG. 2 is a graph which shows the relationship of the coercive force (Hc) to the packing density (g/cm³) of the $\gamma$-$Fe_2O_3$ raw material, the acicular chromium oxide and sample A-6 of the invention. The graph shows that the coefficient of variation of the coercive force changes relative to the bulk density at a rate for sample A-6 which is similar to that for the acicular chromium dioxide but is substantially less than the rate for the $\gamma$-$Fe_2O_3$ raw material.

TABLE 1

| Sample No. | Iron oxide (acicular) | $CoCl_2$ (g) | NaOH (g) | Reaction temperature (° C) | Cobalt Hyroxide (g) | Hc (Oe) | $\sigma$s (emu/g) | $\sigma$r (emu/g) | $\sigma$r/$\sigma$s |
|---|---|---|---|---|---|---|---|---|---|
|  | $Fe_2O_3$ |  |  |  |  | 448 | 75.1 | 37.3 | 0.496 |
| A-1 | 100 g | 4g | 8g | 100° C | 2.86 | 506 | 74.5 | 37.0 | 0.496 |
| A-2 | 100 | 4 | 16 | 100 | 2.86 | 507 | 74.1 | 36.6 | 0.494 |
| A-3 | 100 | 4 | 40 | 100 | 2.86 | 512 | 74.1 | 37.6 | 0.508 |
| A-4 | 100 | 8 | 8 | 100 | 5.72 | 519 | 73.8 | 37.3 | 0.506 |
| A-5 | 100 | 8 | 16 | 100 | 5.72 | 523 | 73.2 | 36.8 | 0.502 |
| A-6 | 100 | 8 | 40 | 100 | 5.72 | 550 | 73.5 | 36.9 | 0.502 |
| A-7 | 100 | 12 | 8 | 100 | 8.58 | 518 | 71.8 | 36.0 | 0.500 |
| A-8 | 100 | 12 | 16 | 100 | 8.58 | 538 | 73.0 | 37.1 | 0.508 |
| A-9 | 100 | 12 | 40 | 100 | 8.58 | 555 | 72.7 | 37.2 | 0.508 |
| A-10 | 100 | 8 | 40 | 80 | 5.72 | 540 | 72.8 | 36.8 | 0.506 |
| A-11 | 100 | 8 | 40 | 60 | 5.72 | 496 | 72.2 | 36.4 | 0.504 |

TABLE 1-continued

| Sample No. | Iron oxide (acicular) | CoCl$_2$ (g) | NaOH (g) | Reaction temperature (°C) | Cobalt Hyroxide (g) | Hc (Oe) | σs (emu/g) | σr (emu/g) | σr/σs |
|---|---|---|---|---|---|---|---|---|---|
| A-12 | 100 | 8 | 40 | 40 | 5.72 | 493 | 72.6 | 35.9 | 0.496 |
| A-13 | 100 | 8 | 40 | 20 | 5.72 | 474 | 71.6 | 35.6 | 0.497 |
| A-14 | 100 | 1 | 8 | 100 | 0.715 | 485 | 75.0 | 37.0 | 0.493 |
| A-15 | 100 | 1 | 40 | 100 | 0.715 | 495 | 75.0 | 36.5 | 0.487 |
| A-16 | 100 | 13 | 8 | 100 | 9.3 | 515 | 72.0 | 36.5 | 0.507 |
| A-17 | 100 | 13 | 40 | 100 | 9.3 | 556 | 71.0 | 36.0 | 0.507 |
| A-18 | 100 | 2.5 | 8 | 100 | 1.78 | 500 | 74.5 | 36.5 | 0.489 |
| A-19 | 100 | 2.5 | 40 | 100 | 1.78 | 510 | 74.0 | 36.0 | 0.487 |
| A-20 | 100 | 14 | 8 | 100 | 10.0 | 515 | 72.0 | 36.0 | 0.500 |
| A-21 | 100 | 14 | 40 | 100 | 10.0 | 557 | 71.0 | 36.0 | 0.507 |

σs = saturated magnetic moment per unit weight
σr = residual magnetic moment per unit weight

EXAMPLE 2

The procedure of Example 1 for preparing Sample A-6 was followed for the preparation of various magnetic samples using various types of iron oxides which have different coercive forces as shown in Table 2.

TABLE 2

| Sample No. | Iron Oxide (acicular) chemical formula | average length | ratio of length to width | Hc (Oe) | σs (emu/g) | σr (emu/g) | σr/σs |
|---|---|---|---|---|---|---|---|
| B-1 | γFe$_2$O$_3$ | 0.4μ | 7/1 | 383 | 75.6 | 37.5 | 0.496 |
|  |  |  |  | 444 | 73.7 | 36.5 | 0.495 |
| B-2 | γFe$_2$O$_3$ | 0.5μ | 8/1 | 422 | 76.1 | 38.7 | 0.509 |
|  |  |  |  | 475 | 74.3 | 37.1 | 0.500 |
| B-3 | Fe$_3$O$_4$ | 0.5μ | 8/1 | 484 | 83.4 | 40.8 | 0.489 |
|  |  |  |  | 565 | 80.6 | 39.3 | 0.488 |

The data from the results of the experiments of Examples 1 and 2 show that the coercive force of the samples of the present invention are 50 – 100 Oe higher than the coercive force of the iron oxide raw material. When the magnetic particles of the invention characterized by high coercive force were dipped into a weakly acidic solution (pH 3–4), the cobalt component was dissolved and the coercive force was the same as that of the iron oxide raw material. These chemical properties have not been exhibited by ferrite type magnetic materials. The products of the invention are believed to be acicular iron oxide crystals adsorbed with the cobalt component as the hydroxide or partial oxide.

EXAMPLE 3

Magnetic tapes were prepared using some of the samples of Examples 1 and 2. Paints of the samples were prepared by the following procedure: One of the magnetic particles of the invention was mixed with toluene containing 2 wt. % lecithin and kneaded by a compact three roller mill. A resin solution (vinlychloride-vinylacetate copolymer: acrylonitrile butadiene copolymer mixture in the ratio of 4 : 1 dissolved in methylethyl ketone, methylisobutyl ketone or the like in a concentration of 7 wt. %) was added to the mixture so as to achieve a magnetic particle-resin ratio of 3 : 1. The mixture was dispersed by a sand grinding mill to form a paint.

The resulting paint was coated as a thin membrane 5-6μ thick on a 2μ thick polyethyleneterephthalate base and the coated base was cut in ½ inch wide strips to form a magnetic tape. The electro-magnetic conversion characteristics and head abrasion characteristics of the tape were tested on a compact size VTR.

The results are shown in Table 3.

TABLE 3

| | Video Characteristics (relative speed 11m/s) | | | Audio Characteristics (19 cm/s) | | | | |
|---|---|---|---|---|---|---|---|---|
| Sample | optimum recording current | 1 MHz output | 5 MHz output | optimum bias current | 400 Hz sensitivity | 10 KHz sensitivity | print effect (1k Hz) | Head Abrasion |
| CrO$_2$ tape | 100% | 0 d B | 0 d B | 100% | 0 dB | 0 dB | 57.0 dB | 26μ |
| Co containing iron oxide tape | 90 | −2.0 | −1.0 | 90 | −2.0 | −3.0 | 46.5 | 3μ |
| A-6 | 100 | +1.0 | +1.5 | 100 | +1.5 | +1.0 | 55.0 | 2.5μ |
| B-1 | 85 | +1.5 | −1.5 | 85 | +2.5 | −1.0 | 51.0 | |
| B-2 | 90 | +1.5 | −1.0 | 90 | +2.0 | −0.5 | 56.5 | |
| B-3 | 100 | +1.0 | +0.5 | 100 | +1.0 | +0.5 | 52.0 | 3μ |

The head abrasion tests were measured by abrasion of the video head tip after running for 100 hours. The tapes coated with paints made from samples A-6 and B-3 have video and audio characteristics superior than those of the tapes coated with CrO$_2$. The printing effects of the tapes of the invention were more than 50 dB which is 5–8 dB higher than the tapes coated with iron oxide containing cobalt. The head wear of the tapes of the invention was about 1/10 of that of the tapes coated with CrO$_2$, and was similar to the head wear of the conventional tapes coated with iron oxide.

FIG. 3a is a graph which shows the relationship of the coefficient of the variation of the coercive force Hc versus the temperature. FIG. 3b is a graph which shows the relationship of the coefficient of the variation of the Br max (retention) versus the temperature. The tapes of the invention have very stable coercive force and retention characteristics to changes in temperature compared to those tapes coated with iron oxide containing cobalt or $CrO_2$. In the tests, the iron oxide-cobalt particles have an acicular shape with an average length of 0.4μ and a ratio of the length to the width of 10 : 1. The composition contained 2.4 wt. % of the cobalt component and had the following magnetic characteristics: Hc of 540 Oe; σs of 73.6 emu/g; σr of 44.2 emu/g; and σr/σs of 0.60. The retention of FIG. 3b was measured by magnetizing the tape in a magnetic field 5,000 Oe. The tape was kept at a specific temperature for 30 minutes and then was cooled at room temperature for 90 minutes. By the procedure of the present invention, magnetic recording media with excellent characteristics can be obtained.

Having now fully described the invention, it will be apparent to one of ordinary skill in the art that many changes and modification can be made thereto without departing from the spirit or scope of the invention as set forth herein.

What is claimed as new and intended to be secured by Letters Patent is:

1. A method of preparing a magnetic recording medium, which comprises:
   depositing magnetic particles of ferromagnetic, acicular iron oxide upon whose surface is absorbed from 0.5 to 10 wt. % cobalt hydroxide in a non-ferrite form based on said iron oxide, on a supporting substrate.

2. The method of claim 1, wherein said acicular iron oxide is $\gamma Fe_2O_3$ or $Fe_3O_4$.

3. The method of claim 1, wherein the cobalt hydroxide adsorbed on said ferromagnetic, acicular iron oxide ranges from 1-5 wt. % based on said iron oxide.

4. The method of claim 1, wherein said ferromagnetic, acicular iron oxide has an average length of 0.1 – 1μ and a ratio of the length to the width of 5 : 1 – 20 : 1.

5. The method of claim 1, wherein said adsorbed cobalt hydroxide contains small, nondetrimental amounts of cobalt oxide.

6. A magnetic recording tape, which comprises:
   a layer of magnetic particles of ferromagnetic, acicular iron oxide, upon whose surface is adsorbed from 0.5 to 10 wt. % of cobalt hydroxide in a non-ferrite form based on said iron oxide on a supporting substrate.

* * * * *